United States Patent [19]

Moskal et al.

[11] Patent Number: 5,585,072
[45] Date of Patent: Dec. 17, 1996

[54] RETRACTABLE CHEMICAL INJECTION SYSTEM

[75] Inventors: Thomas E. Moskal, Pickerington; Michael L. Meuller, Circleville; Ronald E. Sherrick, Lancaster, all of Ohio

[73] Assignee: The Babcock and Wilcox Company, New Orleans, La.

[21] Appl. No.: 379,974

[22] Filed: Jan. 27, 1995

[51] Int. Cl.$^6$ .................................................. B01D 50/00
[52] U.S. Cl. ........................ 422/168; 110/216; 110/345; 422/172; 422/182
[58] Field of Search ........................... 422/168, 172, 422/182, 183; 110/345, 216

[56] References Cited

U.S. PATENT DOCUMENTS

| | | | |
|---|---|---|---|
| 1,809,221 | 6/1931 | Snow et al. . | |
| 2,668,978 | 2/1954 | De Mart . | |
| 3,439,376 | 4/1969 | Nelson et al. . | |
| 4,229,854 | 10/1980 | Johnston, Jr. | 15/316 R |
| 4,813,384 | 3/1989 | Zalewski | 122/379 |
| 5,074,226 | 12/1991 | Lynch | 110/345 |
| 5,176,088 | 1/1993 | Amrhein et al. | 110/346 |
| 5,277,135 | 1/1994 | Dubin et al. | 110/345 |
| 5,281,403 | 1/1994 | Jones | 423/235 |

Primary Examiner—Robert J. Warden
Assistant Examiner—Krisanne M. Thornton
Attorney, Agent, or Firm—Harness, Dickey & Pierce, PLC

[57] ABSTRACT

A retractable chemical injection device especially adapted for introducing a chemical reactant solution into a large scale combustion device such as a fossil fuel fired boiler. The device incorporates a lance tube mounted to a elongated frame located outside of the combustion device which enables the lance tube to be extended into and retracted from the combustion device flue gas stream. The lance tube carries a plurality of axially distributed discharge nozzles enabling the chemical reactant entrained in an injection carrier to be ejected from the nozzles. The injection device provides for atomization of the chemical reactant solution before the mixture passes into the lance tube which provides the beneficial effects of cooling the lance tube and providing a uniform distribution of the chemical solution to the distributed discharge nozzles. Additional features of the injection device include providing a low emissivity coating for the lance tube to reduce heat transfer to the lance tube and means for adjusting the angular position of the lance tube discharge nozzles in use.

3 Claims, 2 Drawing Sheets

RETRACTABLE CHEMICAL INJECTION SYSTEM

BACKGROUND AND SUMMARY OF THE INVENTION

This invention relates to a device for ejecting a chemical reactant into a large scale combustion device such as a boiler for reaction with flue gases.

In an effort to reduce $NO_x$ discharge from large scale combustion devices such as boilers burning fossil fuels, selective non-catalytic reduction (SNCR) is provided by injecting ammonia or other chemicals such as aqueous urea into the flue gases downstream of the combustion zone. By reacting ammonia ($NH_3$) with Nox; nitrogen, water and other products of the chemical reaction are generated thus reducing the environmental impact of the emissions from the combustion device. There are also instances in which it is desired to introduce other chemical reactants into a flue gas stream of a large scale combustion device.

Ammonia and other chemical reactants may be introduced into flue gases using various approaches. In one approach which is commonly used, nozzles positioned on the wall of the boiler spray a chemical reactant into the flue gases. Although this approach produces beneficial results, it has the disadvantage that distribution of the chemical reactant is non-uniform across the high temperature flue gas stream. Another approach for chemical injection is to employ an elongated ejection device which transverses the flue gas stream and dispenses a chemical reactant through nozzles at various positions. One of the principal difficulties in providing such a transversely extending distribution device is related to the high temperature corrosive environment present in the boiler. This environment makes it difficult to provide devices that will operate reliably over a long period of time and are at the same time cost efficient. Typical metal alloys corrode in such an atmosphere and undergo structural degradation in response to the high temperature exposure.

When employing SNCR emission control it is important to inject the chemical reactant into the boiler flue gas when the flue gas is within a particular temperature range. The optimum injection location in the boiler however, varies with load and fuel characteristics. As a result, it would be desirable to provide injection devices at multiple locations which can be actuated as needed based on the temperature range of flue gases in a given area.

When discharging a chemical reactant from a device extending transversely through the flue gas field it is desirable to inject the chemical reactant at various positions in a repeatable uniform manner. Accordingly, some means of insuring homogeneous mixing of the chemical reactant and the carrier gas used is a desirable attribute of such an injection system.

Another desirable feature of a retractable chemical injection device would be the ability to change the angle at which the injected chemical is introduced into the flue gas stream. In order to achieve optimal distribution of the chemical reactant in the fluid stream, it may be necessary to orient the spray at a particular angle with respect to the flow stream. This angle may not be predictable precisely in advance and therefore, experimental or automatic adjustment of the unit in service may be required.

A further desirable feature of such a device would be the ability to implement presently available mechanisms used in the large scale boiler industry, thereby using existing infrastructure for fabrication, operation and maintenance.

The above mentioned desirable attributes of a chemical reactant injection system are provided in accordance with the devices of the present invention.

In accordance with the present invention, a chemical injection device is provided having a retractable lance tube which can be extended into and retracted from the flue gas stream. The lance tube slidably overfits a stationary feed tube. A plurality of discharge nozzles are distributed axially along the lance tube. At the proximal end of the feed tube, a supply of compressed air or another injection carrier such as steam is delivered. One or more atomizer nozzles is positioned within the feed tube and is provided to introduce the chemical reactant which is generally an aqueous solution. By spraying the reactant into the air or steam injection carrier flowing through the feed tube, the reactant becomes entrained within the injection carrier as it passes from the feed tube into the lance tube which provides a number of benefits. First, the latent heat of evaporation of the reactant helps in absorbing heat from the lance tube thereby cooling the lance tube. Moreover, the evaporation of the reactant droplets provides a finally atomized and thoroughly mixed fluid, enabling a uniform distribution of the chemical reactant from the distributed nozzles.

Further refinements of the devices according to this invention include coating the outer surface of the lance tube with a material which lowers its emissivity, thereby reducing radiative heat transfer to the lance tube which allows it to operate at a reduced temperature. Another enhancement is the incorporation of a rotary drive mechanism which allows the angular position of the lance tube, and consequently the discharge nozzles to be changed as desired in use.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE INVENTION

Figure 1:
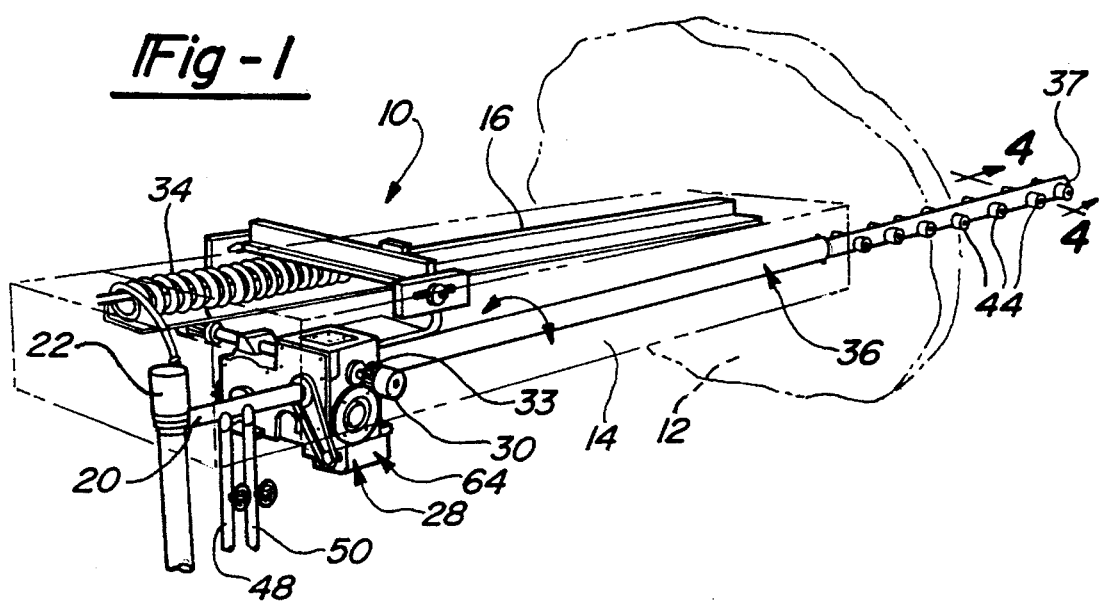
FIG. 1 is a pictorial view of a chemical injection system in accordance with this invention mounted to a boiler wall.

FIG. 1 illustrates retractable chemical injection device 10 in accordance with this invention shown mounted to boiler wall 12 and would be positioned in an appropriate area of the boiler for treatment of flue gases in a desired manner. Since the SNCR reaction occurs with flue gases at a particular temperature range (i.e. about 1800° F.), injection device 10 would be located on the boiler wall 12 such that flue gases in that desired range are present. The boiler can be any one of numerous types of combustion devices burning a variety of fuels such as a coal fired boiler. Other types of combustion devices such as refuse boilers or incinerators might also incorporate an injection device in accordance with the present invention. Although injection device 10 is described in connection with the SNCR process, other types of materials might be introduced incorporating the injection device 10 of the present invention to produce various results.

Figure 2:
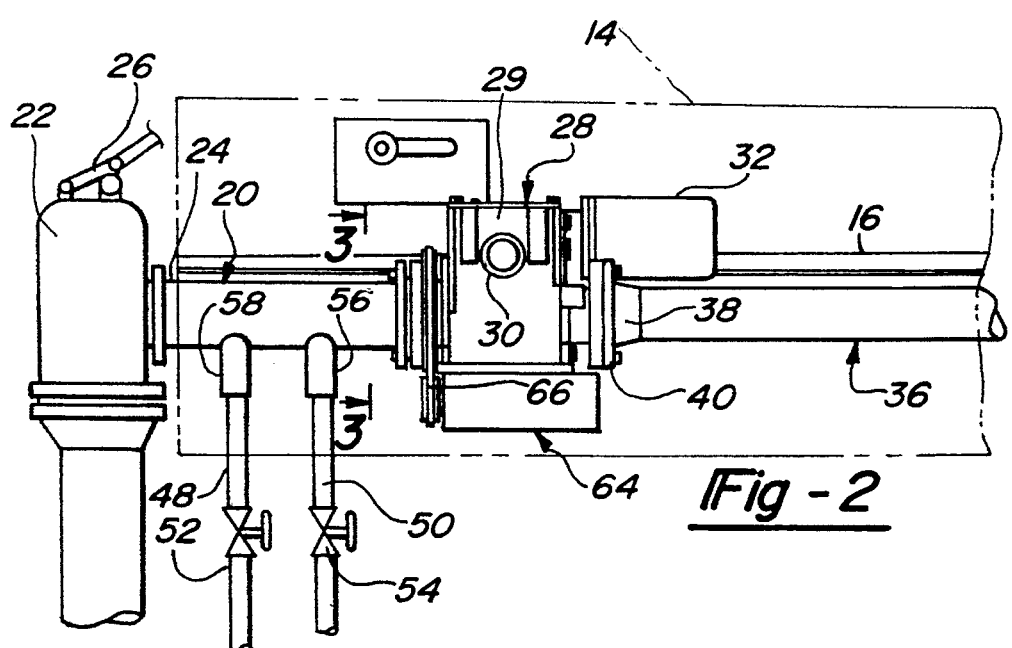
FIG. 2 is a partial enlarged view of the chemical injection system shown in FIG. 1.

Injection device 10 incorporates elongated frame 14 mounted to boiler wall 12. Frame 14 has a pair of elongated tracks 16 and an extended toothed drive rack (not shown). An elongated hollow feed tube 20 is mounted to frame 14 and has a proximal end 24 and a distal end (not shown). Poppet valve 22 is mounted to feed tube proximal end 24 and is supplied by a source of injection carrier such as steam or compressed air which can be provided at a range, for example, of 20 to 50 PSIG. Poppet valve 22 incorporates linkage 26 enabling it to be opened or closed as desired to control the delivery of the injection carrier to feed tube 20. Carriage 28 includes guide rollers 30 which slide along tracks 16 enabling the carriage to be moved from a retracted position where it is positioned adjacent poppet valve 22 as shown in FIGS. 1 and 2, to an extended position at which it approaches boiler wall 12. Carriage 28 includes a drive motor 32 which, through an appropriate gear transmission within carriage housing 29 drives a pair of pinion gears 33 which engage with the drive rack, allowing the carriage to be moved between positions along tracks 16 in a controlled manner. Electrical power and in some cases control signals are transferred to moveable carriage 28 via coiled conductor 34.

Lance tube 36 has a distal end 37 extendable into the boiler and proximal end 38 having a mounting flange 40 mounted to carriage 28. Lance tube 36 slidably overfits feed tube 20. Appropriate packing (not shown) is used to provide a seal between feed tube 20 and lance tube 36. By sending appropriate power and control signals to carriage 28 its position along racks 16 can be controlled thus moving lance tube 36 into a desired inserted or retracted position within the boiler. A port is provided through boiler wall 12 into which lance tube 36 is inserted.

The overall construction of injection device 10 bears many similarities to sootblower units manufactured and sold by the present assignee. In such devices, water, steam or air is ejected from one or more nozzles of the lance tube generating a spray of such cleaning medium which is directed against heat transfer surfaces for cleaning. Accordingly, additional details of the construction of certain features of injection device 10 can be had from corresponding structure described and shown in assignee's previously issued U.S. Pat. Nos. 2,668,978; 3,439,376 and 4,229,854. The sootblower devices described in these patents cause the lance tube to rotate upon insertion and retraction of the lance tube, causing the nozzles to trace a helical path. There is no need to continuously rotate lance tube 36 of injection device 10 during extension and retraction, and therefore carriage 28 is modified in that regard.

In operation it may, however, be desirable to change the angular orientation of discharge nozzles 44 during use. In order to provide this feature, lance rotation motor 64 is carried by carriage 28 and drives chain 66 through sprocket 65 which also engages gear 67 affixed to lance tube mounting flange 40. Through actuation of motor 64, lance tube 36 can be rotated about its longitudinal axis, and thus a precise angular orientation of discharge nozzles 44 can be provided.

Figure 4:
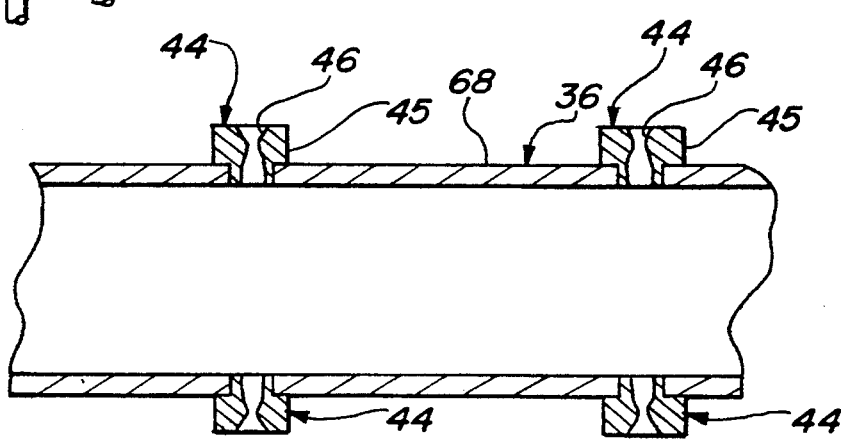
FIG. 4 is a partial cross-sectional view taken along line 4—4 from FIG. 1 showing internal features of the lance tube of the injection system according to this invention.
Figure 3:
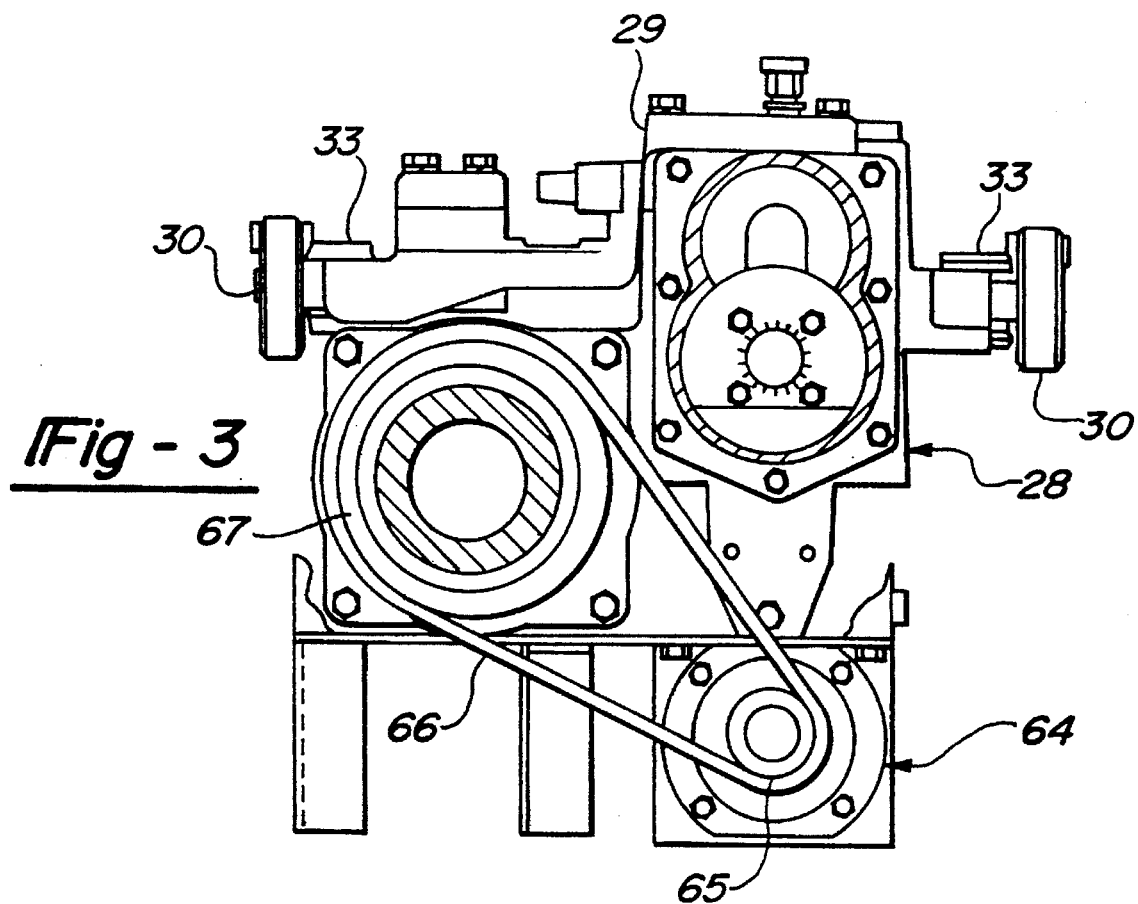
FIG. 3 is an elevational view of the carriage of the chemical injection system of this invention shown in the direction of arrows 3—3 of FIG. 2.

Lance tube 36 incorporates a number of discharge nozzles 44 axially distributed along the length of the lance tube which are best shown in FIG. 4. The orientation and positioning of nozzles 44 is a function of the injection pattern and distribution which is desired. In some instances it would be desired to located nozzles 44 in a diametrically opposed position as illustrated in FIGS. 1 and 4. In other applications, a single row of nozzles may be used or rows displaced at an acute angle. Discharge nozzles 44 can be made in various configurations. Preferably, however, discharge nozzles 44 would have an internal throat 46 having a converging/diverging configuration as shown in FIG. 4 for efficient ejection of the fluid being discharged. Also, in a preferred construction, nozzles 44 would be mounted to lance tube 36 in a manner that they do not protrude inwardly past the inside diameter of the lance tube. Thus, fluids flowing through the hollow lance tube 36 would not encounter inwardly directed obstructions along the inside diameter of the lance tube. It is believed that such obstructions in the fluid flow within the lance tube would have the undesired effect of causing precipitation of chemical reactants entrained in the injection carrier. In addition, inward obstructions would limit the extent to which lance tube 36 could slide over feed tube 20.

One approach toward mounting discharge nozzles 44 as shown in FIG. 4 involves boring lance tube 36 and thereafter positioning a discharge nozzle 44 in the bore where it is either threaded in position or welded. The stepped outside diameter 45 of nozzles 44 provides for proper location.

As best shown in FIG. 2, a pair of supply lines of chemical reactant such as ammonia or urea solution or some mixture thereof is provided. Supply lines 48 and 50 include controllable fluid valves 52 and 54. Supply lines 48 and 50 are tapped into feed tube 20 using a pair of atomizer nozzles 56 and 58. Nozzles 56 and 58 direct a spray of chemical reactant into the injection carrier flowing through feed tube 20 to cause it to be finely atomized and disbursed in the carrier flow stream. Various number of supply lines and atomizer nozzles 56 and 58 could be provided, including a single set of such components. Two sets of such components are shown in the illustrations since, in one envisioned embodiment, two nozzles 56 and 58 would be necessary to provide atomization of the chemical reactant at the flow rate desired.

In some operating conditions it would be necessary to take additional steps to insure that lance tube 36 is protected from overheating to prevent its premature failure. To that end, the lance tube 36 could be insulated with a layer of thermal barrier coating material 68. Potential thermal barrier coating materials include zirconium and aluminum oxides which could be applied by a plasma spray technique. A ceramic coating such as these would have the benefit of lowering the emissivity of lance tube 36 to decrease radiative heat transfer to the lance tube. In addition, the low conductivity of the ceramic barrier would reduce conductive heat transfer to the lance tube. The ceramic coating could be applied onto a buffer layer on the lance tube to accommodate the inherent mismatch between expansion coefficients of the lance tube 36, typically made of stainless steel or Inconel, and the ceramic oxide. The coating 68 would also reduce lance tube corrosion that would otherwise be expected for a lance tube exposed to the high temperature flue gases for extended periods.

In an unused condition of injection device 10, carriage 28 would remain in its retracted position. When it is desired to insert the lance tube 36, poppet valve 22 would be activated to begin a supply of injection carrier through feed tube 20 which would provide a cooling flow sufficient to prevent overheating of lance tube 36 until discharge nozzles 44 are positioned within the boiler. Once inserted to its desired position, valves 52 and 54 would be actuated to begin introduction of the chemical reactant. By mixing the carrier and chemical reactant in the feed tube adjacent its proximal end 24, a number of significant benefits are realized. Vaporization of the chemical reactant would result in cooling of the lance tube 36 due to the latent heat of vaporization of the solution. In addition, evaporation of the reactant droplets overcomes a problem of uniform distribution of the chemical reactant from multiple nozzles 44. It is believed that the chemical reactant solution carried in the carrier flow stream at the proximal end 38 of the lance tube 36 as finally disbursed droplets will result in a highly uniform distribution from the discharge nozzles 44. When it is no longer needed to inject the chemical reactant, its supply is interrupted by actuating valves 52 and 54. Carrier flow continues through feed tube 20 and lance tube 36 to provide a cooling effect and to clear any remaining chemical solution within these tubes. Once lance tube 36 is fully retracted, poppet valve 22 can be actuated to discontinue air flow. In a modified mode of operation, both air and steam injection carriers could be used with air provided during insertion and retraction, and steam used during injection.

While lance tube 36 is in its inserted position, rotation motor 64 can be actuated to appropriately orient discharge nozzles 44 with respect to the flue gas stream for proper mixing with the flue gases. In some applications it is anticipated that lance tube 36 will develop a set deflected condition caused by metal creep due to the cantilever extended condition of the lance tube and the high temperature flue gas field surrounding it. In order to compensate for such creep induced bending, it may be desirable to periodically actuate motor 64 to turn the lance tube 180°.

A desired chemical reaction may ideally occur in a particular flue gas temperature range. This flue gas temperature may not exist in the same location within the boiler flue gas ducting at various operating conditions of the boiler. Accordingly, it may be appropriate to install a number of injection devices 10 distributed to interact at various points along the gas stream, enabling an appropriate injection device to be actuated where proper temperatures conditions exist. In such an arrangement, the remaining injection devices 10 would be maintained in a retracted idle condition and thus not exposed to the flue gases.

While the above description constitutes the preferred embodiments of the present invention, it will be appreciated that the invention is susceptible of modification, variation and change without departing from the proper scope and fair meaning of the accompanying claims.

We claim:

1. An apparatus for injecting a chemical reactant into a gas stream flowing through a combustion device, comprising:

an elongated lance tube having proximal and distal ends, said lance tube having a plurality of discharge nozzles distributed axially along said lance tube, an elongated frame mounted outside the combustion device having a track, a carriage moveable along said track with said lance tube mounted to said carriage at said proximal end for extending a substantial portion of said lance tube into the combustion device and the gas stream and withdrawing said lance tube from the gas stream, a feed tube having a proximal end mounted to said frame and a distal end slidably inserted within said lance tube, first supply means for introducing an injection carrier fluid into said feed tube adjacent said proximal end, second supply means for introducing said chemical reactant into said feed tube at a location between said first supply means and said distal end of said feed tube, said second supply means including at least two spray nozzles mounted to said feed tube, each of said spray nozzles having a separate chemical supply line connected thereto for causing at least two said chemical reactants to be sprayed into and mixed with said carrier fluid in said feed tube whereby a mixture of said carrier fluid and said chemical reactants flow from said feed tube into said lance tube proximal end toward said lance tube distal end and is discharged through said plurality of said discharge nozzles.

2. An apparatus according to claim 9 wherein said discharge nozzles are arranged such that at least two of said discharge nozzles discharge fluid in diametrically opposite directions.

3. An apparatus according to claim 1 wherein said carriage further comprising drive means for selectively rotating said lance tube to thereby change the direction of fluid discharge from said discharge nozzles into said gas stream.

* * * * *

UNITED STATES PATENT AND TRADEMARK OFFICE
CERTIFICATE OF CORRECTION

PATENT NO. : 5,585,072
DATED : 12/17/96
INVENTOR(S) : Moskal et al.

It is certified that error appears in the above-indentified patent and that said Letters Patent is hereby corrected as shown below:

Column 6, Line 36, Claim 2, after "claim" delete "9" and insert —1—.

Signed and Sealed this

Eighteenth Day of March, 1997

Attest:

BRUCE LEHMAN

*Attesting Officer*  *Commissioner of Patents and Trademarks*